United States Patent [19]

Illman et al.

[11] Patent Number: 4,750,166

[45] Date of Patent: Jun. 7, 1988

[54] CONFERENCE CIRCUIT

[75] Inventors: Stephen M. Illman, Catford; Martin Sharpe, Greenwich, both of Great Britain

[73] Assignee: STC PLC, London, England

[21] Appl. No.: 879,055

[22] Filed: Jun. 26, 1986

[30] Foreign Application Priority Data

Jul. 19, 1985 [GB] United Kingdom ................. 8518308

[51] Int. Cl.[4] ................................................ H04J 3/08

[52] U.S. Cl. ...................................................... 370/62

[58] Field of Search .................... 370/62; 379/158, 202

[56] References Cited

U.S. PATENT DOCUMENTS

| | | | |
|---|---|---|---|
| 4,274,155 | 6/1981 | Funderburk et al. | 370/62 |
| 4,535,445 | 8/1985 | Lane et al. | 370/62 |
| 4,644,530 | 2/1987 | Phiet | 370/62 |

*Primary Examiner*—Douglas W. Olms
*Assistant Examiner*—Min Jung
*Attorney, Agent, or Firm*—Lee, Smith & Zickert

[57] ABSTRACT

A conferencing module, for conferencing two PCM words uses threshold detectors (7, 8) to assess whether the word represent signals above a preset threshold, plus a comparator (1) to determine the larger signal. One or other is switched by an electronic switch (5) to the output by control logic (4) as follows:

(i) if only one PCM word is above the threshold it is switched to the output and the switch setting stored in a memory (6), (ii) if both PCM words are above the threshold, and one is larger than the other, that one is switched to the output and the switch setting noted in the memory, (iii) if neither PCM word is above the threshold, the switch is left as it is, and that fact noted in the memory, (iv) if both PCM words exceed the threshold, and are of equal size, the switch is left as it is, and that fail noted in the memory.

Where three or more conferees have to be catered for, three of more circuits of the above type arranged in serial/parallel manner so that the selected words are each routed to the conference circuit's output.

3 Claims, 3 Drawing Sheets

CONFERENCE CIRCUIT

FIELD OF THE INVENTION

This invention relates to the provision of a conference facility in a telecommunication system in which speech is conveyed in Time Division Multiplex (TDM) manner, using Pulse Code Modulation (PCM). .

BACKGROUND OF THE INVENTION

It is well known to conference two or more PCM signals by comparing the signals (ignoring the sign bit), the highest amplitude being passed through to the output. This method is known as the 'Highest Amplitude Wins' method. This occurs at the PCM word rate (8 kHz) and so can rapidly switch between sources. The argument for this approach is that when two people speak simultaneously in a conference call, it is difficult to distinguish one person from the other. Thus any additional distortion due to the rapid switching does not make the situation worse. Hence conferencing two PCM words is effected by simultaneous comparison, whereafter the larger word is transmitted to the listener.

A problem with this method is that while the primary speaker talks, inflections in speech could be lower in amplitude than background noise from the other conferenced channel. Hence the resultant speech has 'glitches' which, in effect, increases back- ground noise in the resultant conferenced signal An object of the invention is to provide a conferencing arrangement in which this difficulty is minimised or overcome.

SUMMARY OF THE INVENTION

According to the invention, there is provided a conference circuit arrangement, which includes input means over which two TDM-PCM signals to be conferenced are received, first and second threshold detectors to which the signals to be conferenced are applied and each of which determines whether the magnitude of the PCM signal applied to it exceeds a preset threshold, a comparator to which the PCM signals are applied and which gives an output indicating which of the said signals is the larger, switch means for connecting one or the other of the PCM signals to an output from the arrangement, a memory in which the condition to which the switch means has most recently been set is stored, and control logic responsive to the results of the operations by the threshold detector and the comparator to control the switch means, the control logic controlling the switch means as follows:

(i) If only one of the PCM signals is above the threshold the switch means is set to apply that signal to the output and the switch status is stored in the memory;

(ii) If both of the PCM signals are above the threshold the output of the comparator which indicates which PCM signal is the larger is used to set the switch means to apply that larger signal to the output, the switch status being stored in the memory;

(iii) if neither of the PCM signals is above the threshold the switch means is set to or left in the condition thereof defined by the memory contents, which latter is left unchanged; and (iv) if both said (PCM) signals exceed the threshold and they are equal in magnitude, the switch means is set to or left in its previous condition as indicated by the memory contents, which latter is left unchanged.

BRIEF DESCRIPTION OF THE DRAWINGS

An embodiment of the invention will now be described with reference to the accompanying drawings, in which FIG. 1 is a simplified block diagram of part of a conference circuit using the invention, while

DESCRIPTION OF PREFERRED EMBODIMENTS OF THE INVENTION

Figure 1:
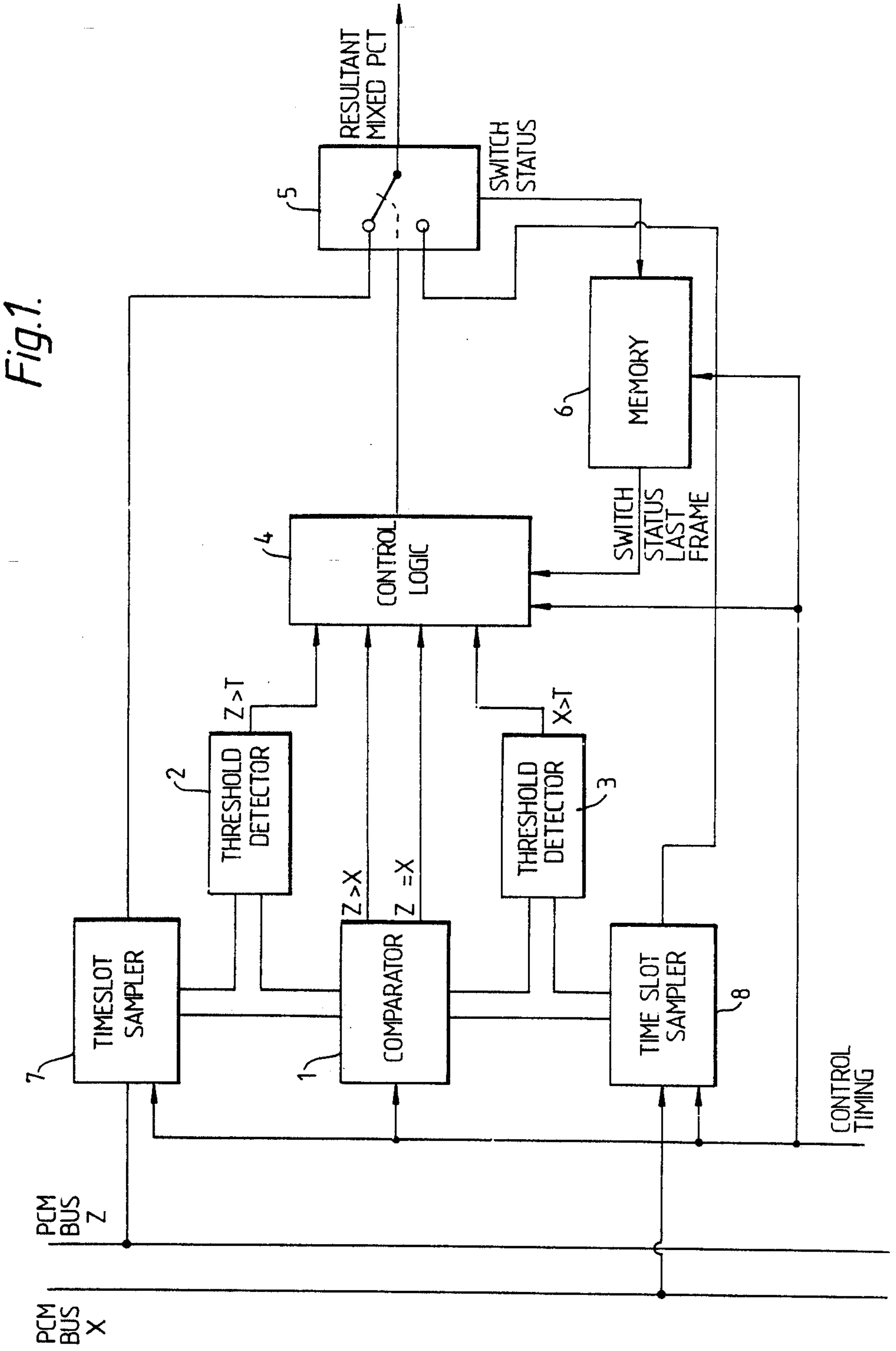

The circuit arrangement shown in FIG. 1 allows the conferencing of PCM words from one or more PCM buses. The resultant output is obtained from a word-by-word comparison from the PCM buses, and this output only has the noise contribution of one input. Thus the signal-to- noise ratio for the output is the same as for any one of the contributing inputs. Such arrangements can therefore be assembled in series or parallel for any number of users or conference circuits without loss of quality of the resulting output.

The operational block diagram, FIG. 1 shows the fundamentals of conferencing selected timeslots from PCM buses A & B.

The timeslots from each PCM bus are compared by a comparator 1 and also by threshold detectors 2 and 3. The control logic 4 then makes the decision on which timeslot to route to the output.

The control logic of the circuit obeys the truth table show below.

| PCM TIMESLOT LEVELS | | | SWITCH POSITION LAST FRAME | SWITCH O/P THIS FRAME |
|---|---|---|---|---|
| A>B | A>T | B<T | X | A |
| A>B | A>T | B>T | X | A |
| A>B | A<T | B<T | Q | Q |
| B>A | B>T | A<T | X | B |
| B>A | B>T | A>T | X | B |
| B>A | B<T | A<T | Q | Q |
| A=B | A>T | B>T | Q | Q |
| A=B | A<T | B<T | Q | Q |

A = Timeslot level for PCM bus A
B = Timeslot level for PCM bus B
T = Threshold level
Q = position of switch (A of B) last frame
X = Don't care The switching output is dependent upon the following:

(a) The magnitude of the inputs compared with a threshold level.

(b) The knowledge of the previously switched position as stored in a memory device 6, which retains the switch status of each timeslot input.

The two threshold detectors 2 and 3 compare the contents of the selected timeslots which they receive via timeslot samplers 7 and 8 respectively with the threshold value T, with the following results:

(a) If only one input is above the threshold, then that input is switched through to the output, and the status of the switch 5 is stored in the memory 6.

(b) If both timeslots are above the threshold level, then the comparator 1 indication as to which input is of the greater magnitude is also used, and this causes the appropriate timeslot to be switched to the output.

The memory 6 records the switch status for every selected timeslot, and this information is used:

(i) If neither input exceeds the threshold, the memory indication as to which timeslot was switched through previously is used to switch the appropriate input to the output.

(ii) If bath inputs exceed the threshold and are equal in magnitude, then the memory indicates which input to switch to the output.

The circuitry can be used on successive timeslots to conference complete frames of data. Such circuits can be cascaded in series or parallel form to create different conference networks and increase the number of users per network.

Figure 2:
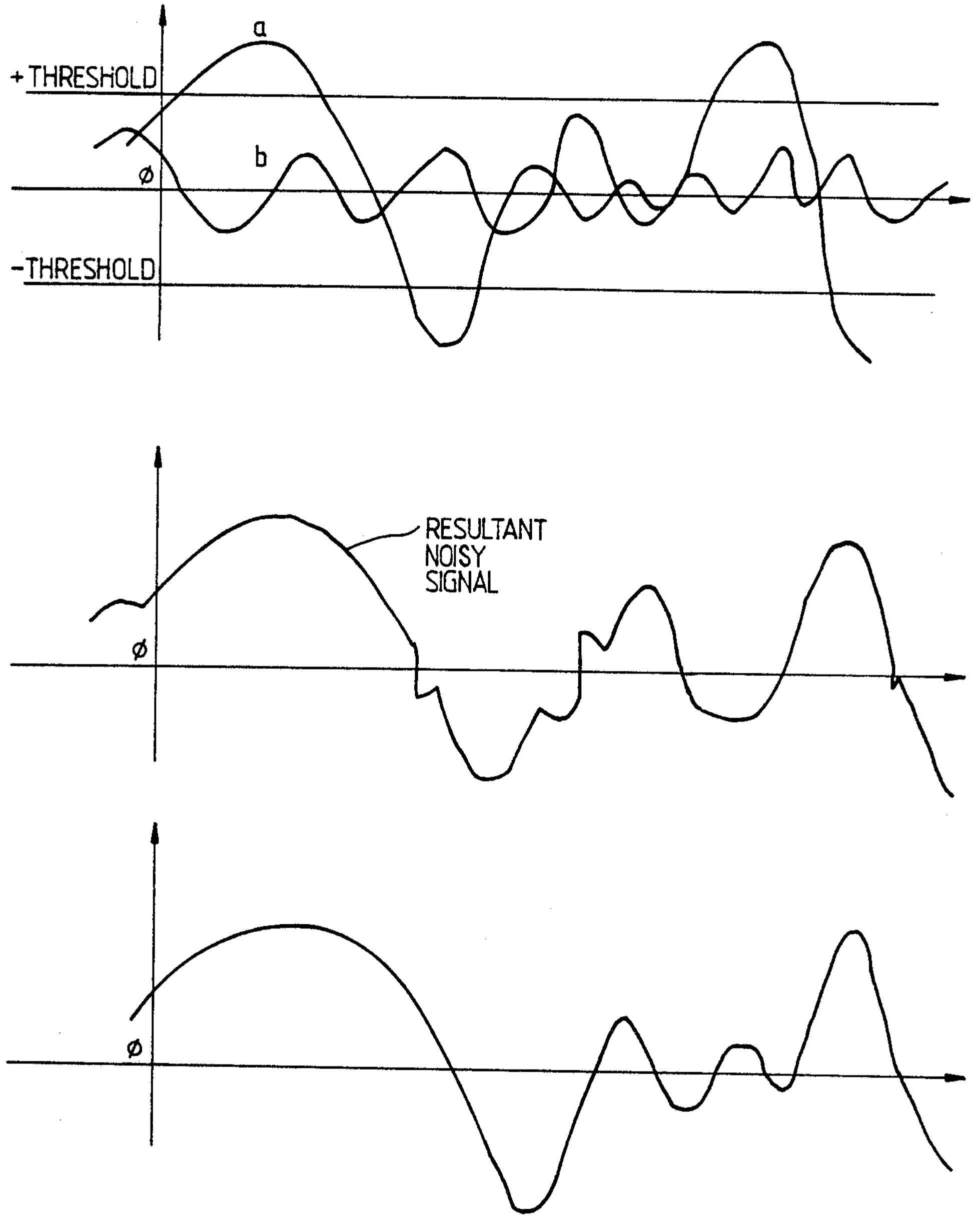
FIG. 2 shows some explanatory waveforms.

FIG. 2 shows the analog output from a bridge with and without the noise reduction. Thus in the uppermost waveform diagram curve (a) is the voice signal from one channel while (b) is the background noise from the other channel. In this case (a) is the active channel while (b) is the passive channel. In the middle waveform diagram we see the waveform produced due to a "highest amplitude wins" option with the background noise signal superimposed. The lowermost waveform shows the result of the "highest amplitude wins" in a system embodying the invention. It will be seen that due to the use of the threshold detector and the control logic no noise is introduced into the signal.

Figure 3:
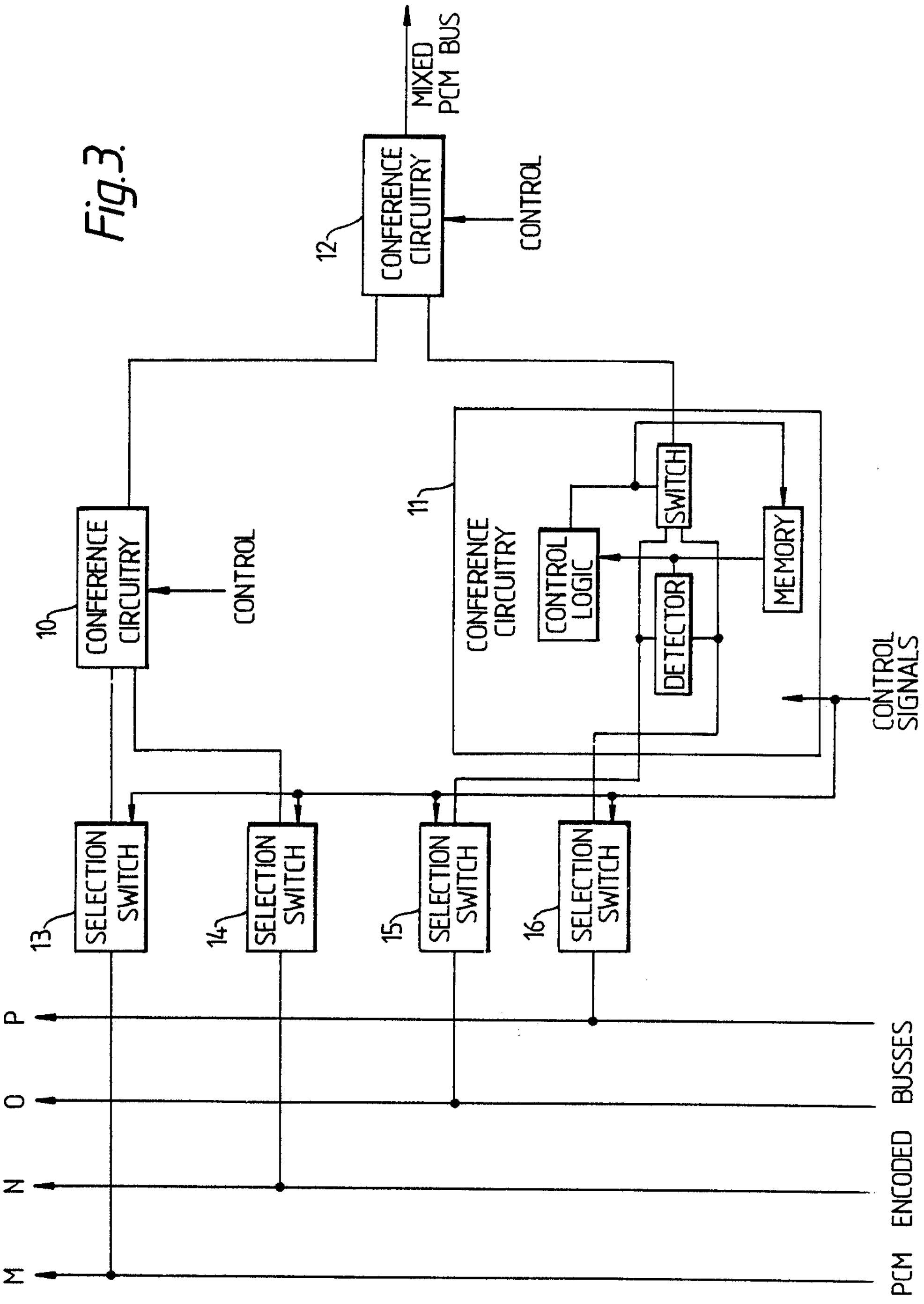
FIG. 3 shows schemetically how several conference circuits, each of the type shown in FIG. 1 can be used in combination.

FIG. 3 shows a circuit in which PCM signals from four PCM encoded buses M, N, 0 and P are conferenced, with three arrangements 10, 11, 12, each as shown in FIG. 1. The contents of such an arrangement are indicated in simplified form in respect of the arrangement 11. The two first stage arrangements 10 and 11 are coupled to the buses via switches 13, 14, 15 and 16. Thus the arrangement 10 is coupled to bus M via switch 13 and to bus N via switch 14, while the arrangement 11 is coupled to bus O via switch 15 and to bus P via switch 16.

The central control (not shown) of the exchange supplies control signals to control the times at which the switches 13 to 16 and the time slot samplers 7 and 8 (see FIG. 1) in the arrangements 10, 11 and 12 respond.

Where more than four busses are involved, more arrangements are used in the first stage so that the circuit then resembles a multi-layer "tree" circuit.

The selected PCM output word is routed, via the mixed PCM bus, to the various conferees, in well-known manner. This can be effected in such a way that the selected conferee, as indicated by memory status, does not receive his own speech sample word.

We claim:

1. A conference circuit arrangement, which includes input means over which two TDM-PCM signals to be conferenced are received, first and second threshold detectors to which the signals to be conferenced are applied and each of which determines whether the magnitude of the PCM signal applied to it exceeds a preset threshold, a comparator to which the PCM signals are applied and which gives an output indicating which of the said signals is the larger, switch means for connecting one or the other of the PCM signals to an output from the arrangement, a memory in which the condition to which the switch means has most recently been set is stored, and control logic responsive to the results of the operations by the threshold detector and the comparator to control the switch means, the control logic controlling the switch means as follows:

(i) if only one of the PCM signals is above the threshold the switch means is set by said control logic to apply that signal to the output and the switch status is stored in the memory;

(ii) if both of the PCM signals are above the threshold the output of the comparator which indicates which PCM signal is the larger is used via said control logic to set the switch means to apply that larger signal to the output, the switch status being stored in the memory;

(iii) if neither of the PCM signals is above the threshold the control logic ensures that the switch means is set to or left in the condition thereof defined by the memory contents, which latter is left unchanged; and (iv) if both said (PCM) signals exceed the threshold and they are equal in magnitude, the control logic causes the switch means to be set to or left in its previous condition as indicated by the memory contents, which latter is left unchanged.

2. A conference circuit which includes first, second and third conference arrangements each as claimed in claim 1, a first selection switch via which a first PCM bus is coupled to one input of the first said conference arrangement, a second selection switch via which a second PCM bus is coupled to another input of the first said conference arrangement, a third selection switch via which a third PCM bus is coupled to an input of the second said conference arrangement, a fourth selection switch via which a fourth PCM bus is coupled to another input of the second said conference arrangement, and connections from the outputs of the first and the second conference arrangements to inputs of the third conference arrangement, said conference arrangements being so controlled that the highest amplitude speech sample is coupled from its said PCM bus via two said conference arrangements to the output of the third said conference arrangement.

3. A conference circuit for conferencing TDM-PCM signals from an even number of conferees, which conference circuit includes a number of circuit arrangements each as recited in claim 1, wherein said circuit arrangements are interconnected in two or more layers of a hierarchical array, such that the first layer of said array includes a plurality of said arrangements each as recited in claim 1 each connected to receive signals from a different pair of conferees, the second layer includes one or more said arrangements each as recited in claim 1 and each connected to receive signals from the output of two said arrangements of the first layer, and so on for subsequent layers, if any.

* * * * *